United States Patent
Giroud et al.

(10) Patent No.: US 11,299,035 B2
(45) Date of Patent: Apr. 12, 2022

(54) FLOW REGULATION DEVICE, FUEL MANAGING SYSTEM COMPRISING SUCH A DEVICE AND AUTOMOTIVE VEHICLE COMPRISING SUCH A SYSTEM

(71) Applicant: VOLVO TRUCK CORPORATION, Gothenburg (SE)

(72) Inventors: François Giroud, Lyons (FR); Hervé Coste, Roche (FR); Manas Phatak, Le Petit-Quevilly (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/976,325

(22) PCT Filed: Jun. 13, 2018

(86) PCT No.: PCT/EP2018/065721
§ 371 (c)(1),
(2) Date: Aug. 27, 2020

(87) PCT Pub. No.: WO2019/238229
PCT Pub. Date: Dec. 19, 2019

(65) Prior Publication Data
US 2021/0001716 A1 Jan. 7, 2021

(51) Int. Cl.
*F16K 15/00* (2006.01)
*B60K 15/03* (2006.01)
*F02M 37/00* (2006.01)

(52) U.S. Cl.
CPC ......... *B60K 15/03* (2013.01); *F02M 37/0017* (2013.01); *F02M 37/0052* (2013.01);
(Continued)

(58) Field of Classification Search
CPC .... F16K 15/026; F16K 15/063; F16K 15/064; F16K 15/065; F16K 2200/00;
(Continued)

(56) References Cited

U.S. PATENT DOCUMENTS

| 5,657,734 A * | 8/1997 | Sawamoto | B60K 15/03519 123/516 |
| 6,394,129 B1 * | 5/2002 | Feichtinger | B60K 15/03519 123/516 |

(Continued)

FOREIGN PATENT DOCUMENTS

| GB | 2550882 A | 12/2017 |
| WO | 2013060404 A2 | 5/2013 |
| WO | 2016071046 A1 | 5/2016 |

OTHER PUBLICATIONS

International Search Report and Written Opinion dated Dec. 12, 2018 in corresponding International PCT Application No. PCT/EP2018/065721, 10 pages.

*Primary Examiner* — John Kwon
(74) *Attorney, Agent, or Firm* — Venable LLP; Jeffri A. Kaminski

(57) ABSTRACT

This flow regulation device comprises a housing (200) having an inlet port (202) and an outlet port (204), and a fluid flow conduit (206) between them, a valve body (208) mounted in the housing (200), and a first (210) and a second (212) orifices allowing fluid flow in the conduit (206). The valve body (208) is movable between an open position, in which the first and second orifices (210, 212) are open, and a closed position, in which only one (210) of the first and second orifices (210, 212) is open. The flow regulation device (20) comprises a resilient element (214) urging the valve body (208) towards its open position, and the valve
(Continued)

body (208) passes from its open to its closed position under action of fluid pressure (P) entering in the inlet port (202).

9 Claims, 3 Drawing Sheets

(52) U.S. Cl.
CPC ............... *F02M 37/0088* (2013.01); *B60K 2015/03144* (2013.01); *B60K 2015/03256* (2013.01)

(58) Field of Classification Search
CPC ............... F16K 15/067; F16K 2200/30; F16K 2200/401; F16K 2200/402
USPC ............ 137/543.23, 515.5; 251/149.1, 149.6
See application file for complete search history.

(56) References Cited

U.S. PATENT DOCUMENTS

| | | | |
|---|---|---|---|
| 6,397,884 B1 * | 6/2002 | Miyajima | F02M 25/0872 |
| | | | 137/543.23 |
| 8,579,332 B2 | 11/2013 | Sonderegger et al. | |
| 8,726,932 B2 * | 5/2014 | Matsubara | F16K 15/026 |
| | | | 137/515.5 |
| 2018/0038320 A1 | 2/2018 | Waples et al. | |

\* cited by examiner

FLOW REGULATION DEVICE, FUEL MANAGING SYSTEM COMPRISING SUCH A DEVICE AND AUTOMOTIVE VEHICLE COMPRISING SUCH A SYSTEM

CROSS-REFERENCE TO RELATED APPLICATIONS

This application is a U.S. National Stage application of PCT/EP2018/065721, filed Jun. 13, 2018, and published on Dec. 19, 2019, as WO 2019/238229 A1, all of which is hereby incorporated by reference in its entirety.

The present invention concerns a flow regulation device, a fuel managing system comprising such a flow regulation device, and an automotive vehicle, such as a truck, comprising such a fuel managing system.

Automotive vehicles, such as trucks, having dual fuel tank systems are known from U.S. Pat. No. 8,579,332. These systems include a primary tank, a secondary smaller tank, a fuel transfer from the secondary tank to the primary tank, and an excess fuel return line that induces sucking fuel from the secondary tank thanks to a venturi effect. This venturi effect has an optimal working flow interval.

Developments in the dual tanks systems may incur increases of the working fuel pressures in the excess fuel return line, provoking a less satisfying working of the venturi effect.

Existing fuel flow control devices, such as WO 2013/060404, do not permit to solve such an issue, as they do not keep the flow through a valve within a predetermined interval, but rather allow a pressure relieving by allowing greater fluid flow in case of pressure increases.

The aim of the invention is to provide a new flow regulation device, which allows to maintain a fluid flow within a requested flow value interval over a given pressure interval.

To this end, the invention concerns a flow regulation device comprising a housing having an inlet port and an outlet port, and a fluid flow conduit between them, a valve body mounted in the housing and a first and a second orifices allowing fluid flow in the conduit. This flow regulation device is characterized in that the valve body is movable between an open position, in which the first and second orifices are open, and a closed position, in which only one of the first and second orifices is open, In that the flow regulation device comprises a resilient element urging the valve body towards its open position, and in that this valve body passes from its open to its closed position under action of fluid pressure entering in the inlet port.

Thanks to the invention, the fluid flow is reduced by the shutting of one of the orifices when the pressure increases above a threshold value. This allows to keep a fluid flow within predetermined limits over a given pressure interval, that is advantageous in the dual tank fuel management system to guarantee satisfying operation of the venturi effect.

According to other aspects of the invention which are advantageous but not compulsory, such a flow regulation device may incorporate one or several of the following features:

The resilient element is formed by a spring mounted in an inner space of the valve body.
The first and second orifices are arranged radially one inside the other.
The first orifice is formed by a through hole provided in the valve body, and the second orifice is formed by an annular space between the valve body and an inner surface of the fluid flow conduit. The second orifice is closed in the closed position of the valve body.
The first orifice has a hydraulic diameter comprised between 0.8 and 1 mm.
The second orifice has a hydraulic diameter comprised between 0.7 and 0.9 mm.
The ratio between the section of the second orifice and the section of the first orifice is comprised between 0.6 and 1, preferably between 0.8 and 0.9.

The invention also concerns a fuel managing system for an automotive vehicle, comprising:
an engine feeding pipe connected to an inlet side of an internal combustion engine of the vehicle,
an engine return pipe,
a primary tank to which the engine feeding pipe is connected,
a secondary tank,
a transfer pipe arranged to allow transfer of fuel from the secondary tank to the primary tank and, preferably, to block fuel circulation in the inverse direction, and
a venturi valve connected on the engine return pipe and arranged to suck fuel in the transfer pipe from the secondary tank towards the primary tank, This fuel managing system is characterized in that it comprises a flow regulation device connected on the engine return pipe upstream the venturi valve, the inlet port being connected to an engine side of the engine return pipe, and the outlet port being connected to a tank side of the engine return pipe.

The invention also concerns an automotive vehicle comprising a fuel management system as mentioned here-above.

The invention will now be explained in reference to the annexed drawings, as an illustrative example. In the annexed drawings.

Figure 1:
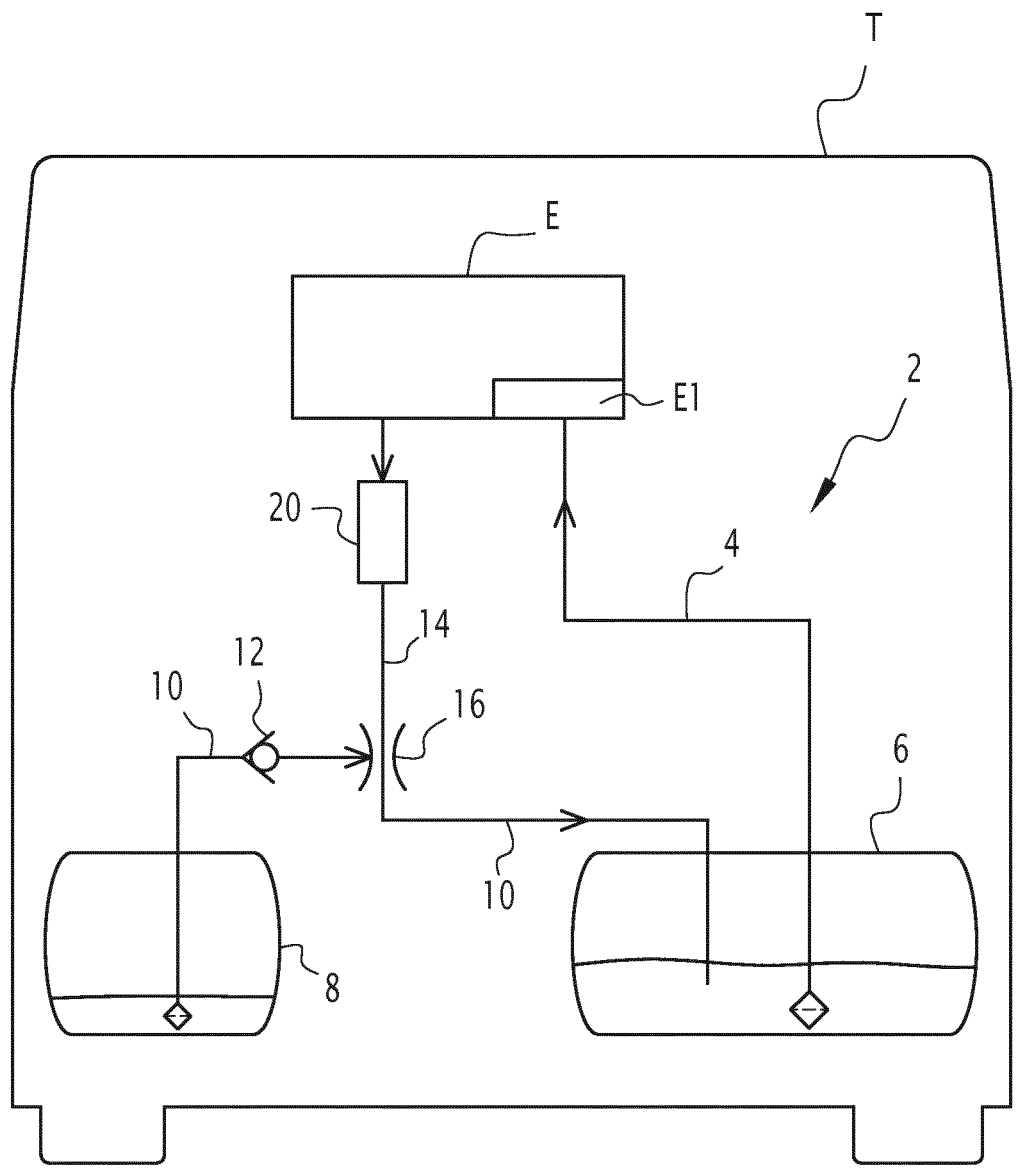
FIG. 1 is a schematic view of a fuel management system according to the invention, integrated in an automotive vehicle according to the invention.
Figure 2:
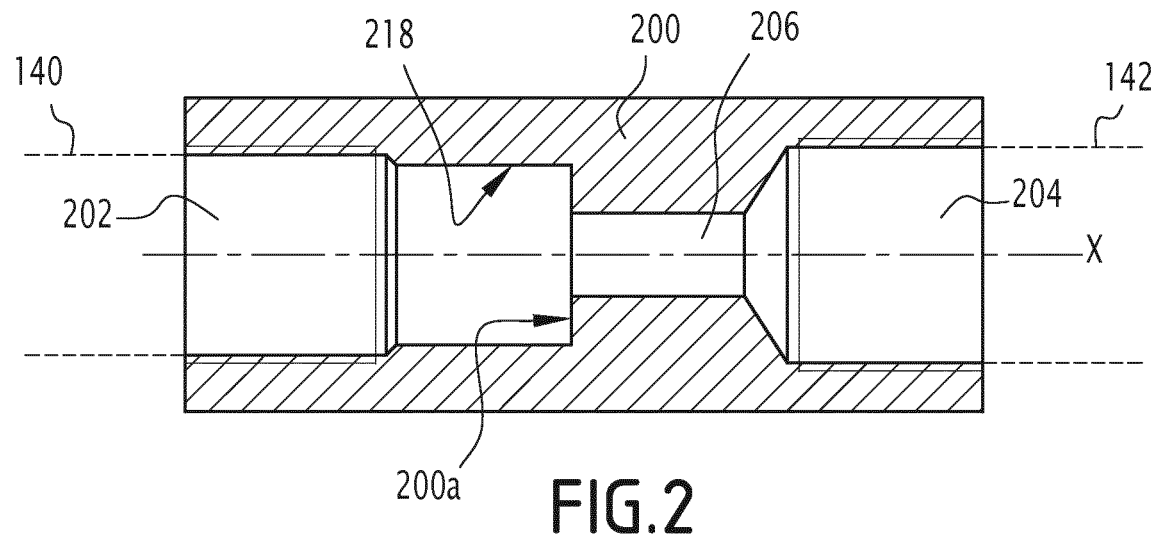
FIG. 2 is longitudinal sectional view of a housing of a flow regulation device according to the invention.
Figure 3:
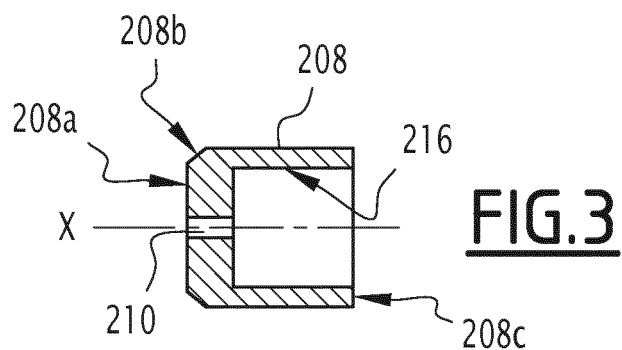
FIG. 3 is a longitudinal sectional view of a valve body of a flow regulation device according to the invention.

FIG. 1 shows a fuel managing system 2 integrated in an automotive vehicle, such as a truck T equipped with an internal combustion engine E. The system 2 comprises an engine feeding pipe 4 connected to an inlet side μl of the internal combustion engine E. The engine feeding pipe 4 sucks fuel from a primary tank 6 of the fuel managing system 2, to which the engine feeding pipe 4 is connected.

The system 2 also includes a secondary tank 8, and a transfer pipe 10 arranged to allow transfer of fuel from the secondary tank 8 to the primary tank 6 and, preferably, block fuel circulation in the inverse direction. The transfer pipe 10 comprises a check valve 12 allowing fuel to flow from the secondary tank 8 to the primary tank 6 only. The primary and secondary tanks 6 and 8 comprise non-shown fuel sucking devices and air vents. The primary tank 6 has a volume superior to the volume of the secondary tank 8.

The system 2 also comprises an engine return pipe 14, which allows to recover excess fuel that is not fed to the engine E and to return it to the primary tank 6. The engine return pipe 14 is connected to the transfer pipe 10 via a venturi valve 16. The venturi valve 16 is arranged to suck fuel in the transfer pipe 10 from the secondary tank 8 towards the primary tank 6. The venturi valve 16 comprises a restriction in the return flow that creates a depression that sucks fuel from the secondary tank 8 towards the transfer pipe 10 and the primary tank 6. Such a principle is disclosed in U.S. Pat. No. 8,579,332 and will not be further detailed.

The operation of this system implies that the fuel return flow stays within a predetermined interval that guarantees a satisfying venturi effect and sucking of the fuel in the secondary tank 8. In some cases, the optimal fuel return flow can be comprised between Qmin=0.6 l/min and Qmax=1 l/min.

The system 2 therefore comprises a flow regulation device 20 connected on the engine return pipe 14 upstream the venturi valve 16. The flow regulation device 20 comprises a housing 200 having an inlet port 202 and an outlet port 204, and a fluid flow conduit 206 between them. The inlet port 202 is connected to an engine side 140 of the engine return pipe 14, and the outlet port 204 is connected to a tank side 142 of the engine return pipe 14. The housing 200 extends along a longitudinal axis X.

Figure 4:
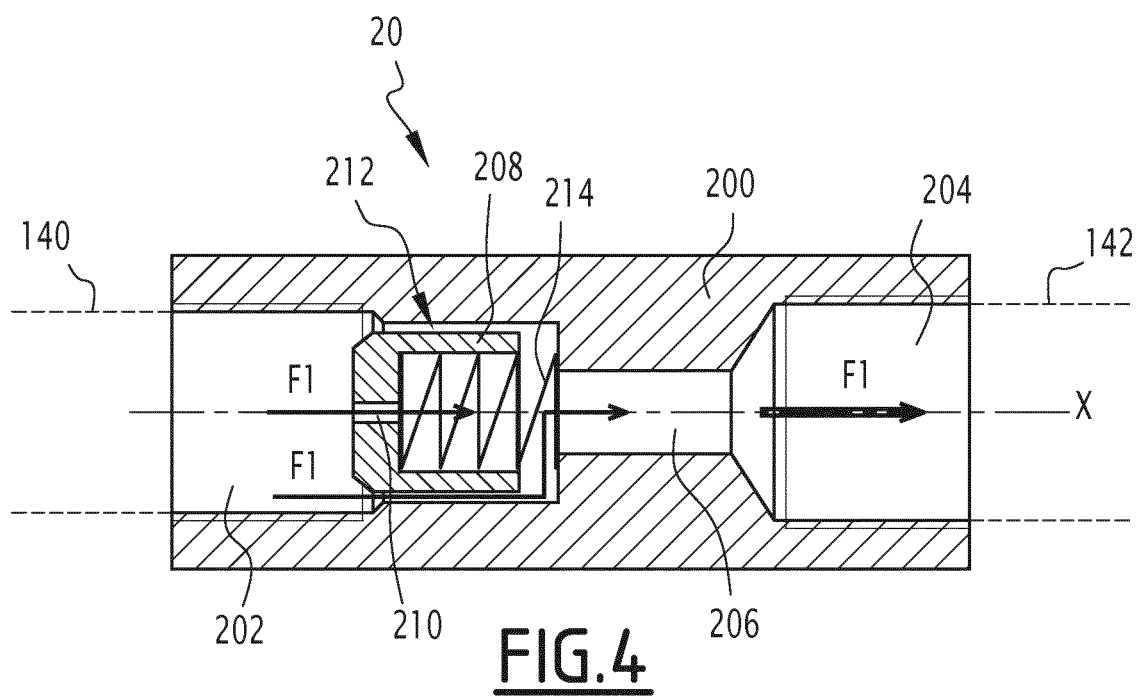
FIG. 4 is a longitudinal sectional view of a flow regulation device according to the invention, in an open state.

The flow regulation device 20 comprises a valve body 208 mounted in the housing 200, and a first and a second orifices 210 and 212 allowing fluid flow in the conduit 206. The valve body 208 is movable along the axis X between an open position, represented on FIG. 4, in which the first and second orifices 210 and 212 are open, and a closed position represented on FIG. 5, in which only one of the first and second orifices 210 and 212 is open. The flow regulation device 20 comprises a resilient element, formed by a spring 214, urging the valve body 208 towards its open position. The valve body 208 passes from its open to its closed position under action of fluid pressure entering in the inlet port 202.

The spring 214 is mounted centered on axis X in an inner space 216 of the valve body 208. This guarantees a satisfying axial compactness of the device 20.

The first and second orifices 210 and 212 are arranged radially one inside the other. The first orifice 210 is formed by a through hole provided in the valve body 208, and the second orifice 212 is formed by an annular space between the valve body 208 and an inner surface 218 of the fluid flow conduit 206. The second orifice 212 is closed in the closed position of the valve body 208.

This structure of the orifices and of the spring allows a symmetrical construction around the central axis X. This guarantees the centering of the spring 214 and a better control of the efforts, avoiding lateral deformations of the spring 214 and misalignment of the valve body 208.

Figure 6:
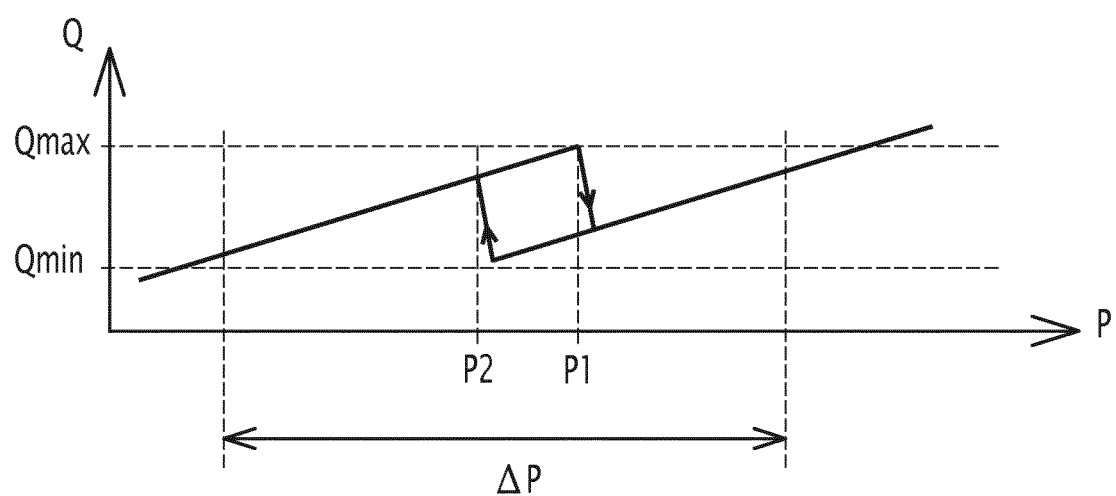
FIG. 6 is pressure versus flow chart depicting the operation of the flow regulation device of FIGS. 4 and 5.

The working principle of the flow regulation device is detailed hereafter in connection with FIG. 6. In absence of fluid flow, a pressure P in the inlet port 202 is null. The device is in its open configuration, the spring 214 pushes the valve body 208 towards its open position.

If a fluid circulation occurs, the pressure P progressively increases, and the fluid flow Q circulating through the device 20 also increases proportionally to the pressure P.

The force of the pressure P is exerted on faces 208a and 208b of the valve body 208. This force is opposed to the force of the spring 214. During the first phase of the increasing of the pressure P, the force of the pressure P does not overcome the force of the spring 214 and the valve body 208 remains in open position, allowing maximal fluid flow F1 through the first and second orifices 210 and 212.

Figure 5:
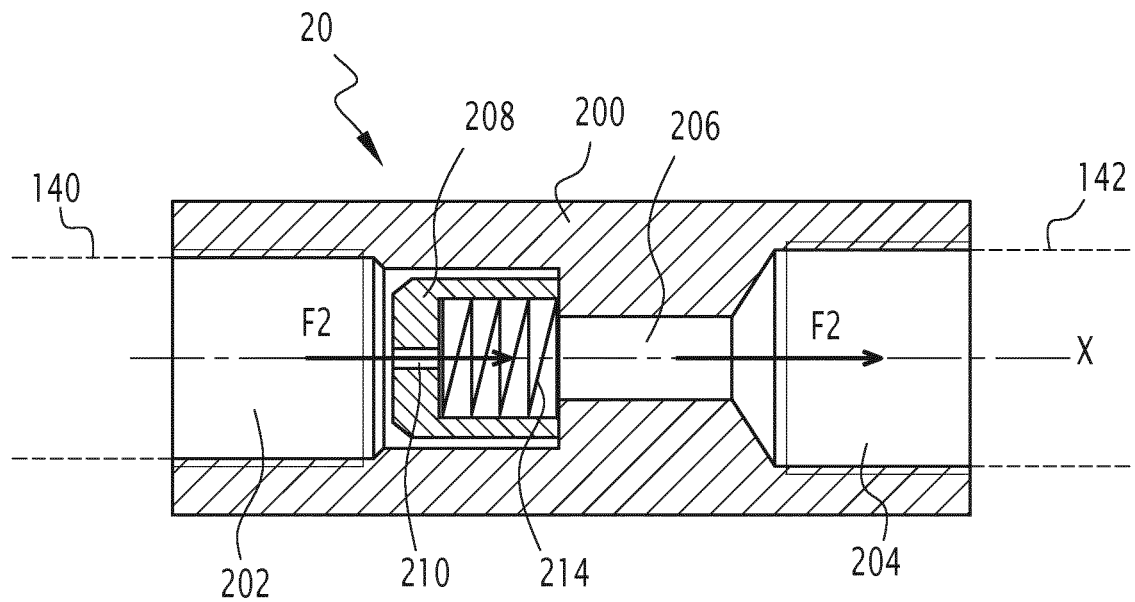
FIG. 5 is a view similar to FIG. 4, in a closed state of the flow regulation device.

Once the force of the pressure P overcomes the force of the spring 214, at a pressure P1, the valve body 208 is moved against the action of the spring 214 towards its closed position. The second orifice is closed by the contact between an axial annular surface 208c of the valve body 208 and an axial annular surface 200a of the housing 200. There is therefore no more fluid communication between the annular space that forms the second orifice 212 and the fluid conduit 206. Only the first orifice 210 therefore sees fluid circulation F2 (FIG. 5). The fluid flow Q is therefore reduced. This allows maintaining the fluid flow Q within a predetermined interval.

The pressure P1 is chosen so that the fluid flow value Qmax is obtained when the valve body 208 closes within the requested flow interval.

The pressure P may continue to increase. If so, the second orifice 212 remains closed, avoiding the fluid flow Q to overpass the maximal flow value Qmax.

If the pressure P decreases, becoming inferior to P1, the valve body 208 opens up again, allowing the flow Q to increase again, so that is does not pass below a minimal value Qmin.

The flow regulation device 20 guarantees that the fluid flow circulating towards the outlet port 204 is kept between a predetermined flow interval Qmax-Qmin over a given pressure interval ΔP.

The flow regulation device 20 has a very simple and cost effective structure, given its only two parts and one spring.

An hysteresis effect may occur during the decrease of the pressure P, due to the operation of the spring 214 and a turbulent flow of the fluid occurring during the closing of the valve body 208. This may imply that the valve body 208 opens at a pressure P2 that is inferior to the pressure P1. According to an example, P1 may be equal to 2.5 bar, and P2 may be equal to 1.2 bar.

According to an embodiment, the first orifice 210 may have a hydraulic diameter comprised between 0.8 and 1 mm.

According to an embodiment, the second orifice 212 may have a hydraulic diameter comprised between 0.7 and 0.9 mm.

For example, the hydraulic diameter of the first orifice 210 may be 0.9 mm, while the hydraulic diameter of the second orifice 12 is 0.8 mm.

The term "hydraulic diameter" is used in reference to its accepted meaning in the field of fluid dynamics.

According to an embodiment, the ratio between the section of the second orifice 212 and the section of the first orifice 210 may be comprised between 0.6 and 1, preferably between 0.8 and 0.9.

The invention claimed is:

1. Flow regulation device comprising: a housing having an inlet port and an outlet port, and a fluid flow conduit between them, a valve body mounted in the housing, a first and a second orifices allowing fluid flow in the conduit, wherein: the valve body is movable between an open position, in which the first and second orifices are open, and a closed position, in which only one of the first and second orifices is open, the flow regulation device comprises a resilient element urging the valve body towards its open position, the valve body passes from its open to its closed position under action of fluid pressure entering in the inlet port.

2. Flow regulation device according to claim 1, wherein the resilient element is formed by a spring mounted in an inner space of the valve body.

3. Flow regulation device according to claim 1, wherein the first and second orifices are arranged radially one inside the other.

4. Flow regulation device according to claim 3, wherein the first orifice is formed by a through hole provided in the valve body, and the second orifice is formed by an annular space between the valve body and an inner surface of the fluid flow conduit, and wherein the second orifice is closed in the closed position of the valve body.

5. Flow regulation device according to claim 1, wherein the first orifice has a hydraulic diameter comprised between 0.8 and 1 mm.

6. Flow regulation device according to claim 1, wherein the second orifice has a hydraulic diameter comprised between 0.7 and 0.9 mm.

7. Flow regulation device according to claim 1, wherein the ratio between the section of the second orifice and the section of the first orifice is comprised between 0.6 and 1, preferably between 0.8 and 0.9.

8. Fuel managing system for an automotive vehicle, the system comprising: an engine feeding pipe connected to an inlet side of an internal combustion engine of the vehicle, an engine return pipe, a primary tank to which the engine feeding pipe is connected, a secondary tank, a transfer pipe arranged to allow transfer of fuel from the secondary tank to the primary tank and, preferably, to block fuel circulation in the inverse direction, a venturi valve connected on the engine return pipe and arranged to suck fuel in the transfer pipe from the secondary tank towards the primary tank, wherein it comprises a flow regulation device according to claim 1, connected on the engine return pipe upstream the venturi valve, the inlet port being connected to an engine side of the engine return pipe, and the outlet port being connected to a tank side of the engine return pipe.

9. Automotive vehicle, such as a truck comprising a fuel managing system according to claim 8.

* * * * *